United States Patent
Cheung et al.

(10) Patent No.: US 12,455,771 B2
(45) Date of Patent: *Oct. 28, 2025

(54) SYSTEMS AND METHODS FOR DETERMINING TARGET ALLOCATION PARAMETERS FOR INITIATING TARGETED COMMUNICATIONS IN COMPLEX COMPUTING NETWORKS

(71) Applicant: THE TRADE DESK, INC., Ventura, CA (US)

(72) Inventors: Dennis Cheung, Belmont, CA (US); Konstantinos Karampelas, London (GB); Alexander L. Schaefer, Boulder, CO (US); Oliver J. S. Sourbut, Bath (GB)

(73) Assignee: The Trade Desk, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/214,907

(22) Filed: May 21, 2025

(65) Prior Publication Data

US 2025/0284545 A1 Sep. 11, 2025

Related U.S. Application Data

(63) Continuation of application No. 19/007,241, filed on Dec. 31, 2024, which is a continuation of application
(Continued)

(51) Int. Cl.
*G06F 9/50* (2006.01)
*G06F 9/48* (2006.01)
*G06F 11/30* (2006.01)

(52) U.S. Cl.
CPC .......... *G06F 9/5027* (2013.01); *G06F 9/4837* (2013.01); *G06F 9/5016* (2013.01); *G06F 11/3006* (2013.01); *G06F 2209/503* (2013.01)

(58) Field of Classification Search
CPC .... G06F 9/5027; G06F 9/4837; G06F 9/5016; G06F 11/3006; G06F 2209/503
See application file for complete search history.

(56) References Cited

U.S. PATENT DOCUMENTS 10,374,970 B2    8/2019   Patil et al.
10,977,084 B1    4/2021   Cheung et al.
(Continued)

FOREIGN PATENT DOCUMENTS

CN    112994926 B    5/2023
CN    116389258 A    7/2023

*Primary Examiner* — Wissam Rashid
(74) *Attorney, Agent, or Firm* — Baker & McKenzie LLP

(57) ABSTRACT

This disclosure is directed to systems and methods for determining target allocation parameters for initiating targeted communications in complex computing networks, which may be associated with the allocation of allocatables in execution events over a period of time. The systems and methods may include receiving a desired allocation; determining a first available allocation at a first time; generating allocation information for a second period comprising the first time; determining a second available allocation at a second time; determining a remaining available allocation, based on the allocation information and the second available allocation; and determining one or more target allocation parameters for initiating a targeted communication to a computing device after the second time.

20 Claims, 2 Drawing Sheets

Related U.S. Application Data

No. 18/830,410, filed on Sep. 10, 2024, now Pat. No. 12,260,254, which is a continuation of application No. 18/587,648, filed on Feb. 26, 2024, now Pat. No. 12,099,877, which is a continuation of application No. 18/214,321, filed on Jun. 26, 2023, now Pat. No. 11,915,052, which is a continuation of application No. 17/228,569, filed on Apr. 12, 2021, now Pat. No. 11,687,371, which is a continuation of application No. 16/716,453, filed on Dec. 16, 2019, now Pat. No. 10,977,084.

(56) References Cited

U.S. PATENT DOCUMENTS

| | | |
|---|---|---|
| 11,687,371 B2 | 6/2023 | Cheung et al. |
| 11,915,052 B2 | 2/2024 | Cheung et al. |
| 12,099,877 B2 | 9/2024 | Cheung et al. |
| 12,260,254 B2 | 3/2025 | Cheung et al. |
| 2005/0038834 A1 | 2/2005 | Souder et al. |
| 2013/0124308 A1 | 5/2013 | Hegeman et al. |
| 2016/0275571 A1 | 9/2016 | Deng et al. |
| 2018/0254998 A1 | 9/2018 | Cello et al. |
| 2021/0232434 A1 | 7/2021 | Cheung et al. |
| 2023/0350719 A1 | 11/2023 | Cheung et al. |
| 2024/0202035 A1 | 6/2024 | Cheung et al. |

SYSTEMS AND METHODS FOR DETERMINING TARGET ALLOCATION PARAMETERS FOR INITIATING TARGETED COMMUNICATIONS IN COMPLEX COMPUTING NETWORKS

CROSS-REFERENCE TO RELATED APPLICATIONS

This U.S. application claims priority to, and is a continuation of U.S. patent application Ser. No. 19/007,241, filed on Dec. 31, 2024, which claims priority to, and is a continuation of U.S. patent application Ser. No. 18/830,410, filed on Sep. 10, 2024, now U.S. Pat. No. 12,260,254, issued on Mar. 25, 2025, which claims priority to, and is a continuation of U.S. patent application Ser. No. 18/587,648, filed on Feb. 26, 2024, now U.S. Pat. No. 12,099,877, issued on Sep. 24, 2024, which claims priority to, and is a continuation of U.S. patent application Ser. No. 18/214,321, filed on Jun. 26, 2023, now U.S. Pat. No. 11,915,052, issued on Feb. 27, 2024, which claims priority to, and is a continuation of U.S. patent application Ser. No. 17/228,569, filed on Apr. 12, 2021, now U.S. Pat. No. 11,687,371, issued on Jun. 27, 2023, which claims priority to, and is a continuation of U.S. patent application Ser. No. 16/716,453, filed on Dec. 16, 2019, now U.S. Pat. No. 10,977,084, issued on Apr. 13, 2021, all the disclosures of which are incorporated by reference herein in their entirety for all purposes.

TECHNICAL FIELD

Generally, the present disclosure relates to targeted communications in complex computing networks.

BACKGROUND

Execution of operations requires resources. These resources may include material, energy, currency, data, computing power, computing storage, computing memory, etc., which may be finite in nature. For example, only a limited quantity of resources may be available. As another example, the resources may be available only during a limited period of time. Therefore, efficient usage of resources is important for successful execution of operations.

SUMMARY

An allocatable (e.g., material, energy, currency, data, computing power, computing storage, computing memory, etc.) may be allocated from an allocation pool over time (t) in a series of execution events (data transfers, data/signal processing operations, spending operations, targeted communications, computing resource allocations, etc.), each of which may be defined by one or more allocation parameters (e.g., timing, frequency, quantity (absolute or relative with regard to total allocatables), etc.). The initiated execution events may initiate, comprise, or be associated with targeted communications.

According to some embodiments, a method for determining one or more target allocation parameters for initiating targeted communications, comprises establishing a first network communication channel with a first computing device; receiving, using one or more computing device processors, from the first computing device, on the first network communication channel, a desired allocation for a first period comprising a first time, a second time, and a third time, wherein the third time is an end time of the first period; establishing a second network communication channel with a second computing device; receiving, using one or more computing device processors, from the second computing device, on the second network communication channel, data associated with a first execution event; determining, using the one or more computing device processors, and based on the data associated with the first execution event, a first instantaneous available allocation at the first time; generating, using the one or more computing device processors, and based on at least the first instantaneous available allocation, an allocation graph for a second period comprising the first time and not the second time; establishing a third network communication channel with the second computing device or a third computing device; receiving, using the one or more computing device processors, from the second computing device or the third computing device, on the third network communication channel, data associated with a second execution event; determining, using the one or more computing device processors, and based on the data associated with the second execution event, a second instantaneous available allocation at the second time after the first time, wherein the second instantaneous available allocation is not used to generate the allocation graph associated with the second period comprising the first time and not the second time; establishing a first communication channel with a database or a memory; initiating transmission of, using the one or more computing device processors, on the first communication channel with the database or the memory, the second instantaneous available allocation for storage in the database or the memory; determining, using the one or more computing device processors, and based on the allocation graph for the second period comprising the first time, and not the second time, and the second instantaneous available allocation at the second time, a remaining available allocation at the second time; and determining, using the one or more computing device processors, and based on the remaining available allocation and the desired allocation, the one or more target allocation parameters for initiating a targeted communication to a fourth computing device, different from the second computing device and the third computing device, during at least a portion of a third period between the second time and the third time.

According to some embodiments, each of the data associated with the first execution event and the data associated with the second execution event comprises data associated with one or more of: an opportunity to allocate as a part of an execution event, an attempted execution event, and a successful execution event.

According to some embodiments, each of the first execution event and the second execution event comprises one or more of: a data transfer, a data or signal processing operation, a data allocation, a material resource allocation, an energy resource allocation, a targeted communication, and a computing resource allocation.

According to some embodiments, the method further comprises initiating transmission of, using the one or more computing device processors, on the first communication channel with the database or the memory, the first instantaneous available allocation for storage in the database or the memory.

According to some embodiments, the method further comprises initiating retrieval of, using the one or more computing device processors, on the first communication channel with the database or the memory, the first instantaneous available allocation stored in the database or the memory.

According to some embodiments, the method further comprises generating, using the one or more computing device processors, a data compilation, wherein the data compilation comprises the first instantaneous available allocation.

According to some embodiments, the method further comprises establishing a second communication channel with the database or the memory; and initiating retrieval of, using the one or more computing device processors, on the second communication channel with the database or the memory, the first instantaneous available allocation stored in the database or the memory.

According to some embodiments, the database comprises a cloud-based database.

According to some embodiments, the targeted communication is associated with a third execution event.

According to some embodiments, the third execution event comprises one or more of: a data transfer, a data allocation operation, a data or signal processing operation, a material resource allocation, an energy resource allocation, and a computing resource allocation.

According to some embodiments, the method further comprises establishing a fourth network communication channel with a fifth computing device; and initiating transmission of, using the one or more computing device processors, on the fourth network communication channel with the fifth computing device, the allocation graph.

According to some embodiments, the fifth computing device comprises a streaming platform.

According to some embodiments, the method further comprises initiating retrieval of, using the one or more computing device processors, the allocation graph from the fifth computing device.

According to some embodiments, a computing system for determining one or more operation parameters associated with determining target allocation parameters for initiating targeted communications in complex computing networks comprises at least one memory comprising instructions; one or more computing device processors for executing the instructions, wherein the instructions cause the one or more computing device processors to perform operations of: establishing a first network communication channel with a first computing device; receiving, using one or more computing device processors, from the first computing device, on the first network communication channel, a desired allocation for a first period comprising a first time, a second time, and a third time, wherein the third time is an end time of the first period; establishing a second network communication channel with a second computing device; receiving, using one or more computing device processors, from the second computing device, on the second network communication channel, data associated with a first execution event; determining, using the one or more computing device processors, and based on the data associated with the first execution event, a first instantaneous available allocation at the first time; generating, using the one or more computing device processors, and based on at least the first instantaneous available allocation, allocation data for a second period comprising the first time and not the second time; establishing a third network communication channel with the second computing device or a third computing device; receiving, using the one or more computing device processors, from the second computing device or the third computing device, on the third network communication channel, data associated with a second execution event; determining, using the one or more computing device processors, and based on the data associated with the second execution event, a second instantaneous available allocation at the second time after the first time, wherein the second instantaneous available allocation is not used to generate the allocation data associated with the second period comprising the first time and not the second time; establishing a first communication channel with a database or a memory; initiating transmission of, using the one or more computing device processors, on the first communication channel with the database or the memory, the second instantaneous available allocation for storage in the database or the memory; determining, using the one or more computing device processors, and based on the allocation data for the second period comprising the first time, and not the second time, and the second instantaneous available allocation at the second time, a remaining available allocation for allocating at the second time or after the second time; and determining, using the one or more computing device processors, and based on the remaining available allocation and the desired allocation, the one or more target allocation parameters for initiating a targeted communication to a fourth computing device, different from the second computing device and the third computing device, during at least a portion of a third period between the second time and the third time.

According to some embodiments, the instructions further cause the one or more computing device processors to perform initiating transmission of, using the one or more computing device processors, on the first communication channel with the database or the memory, the first instantaneous available allocation for storage in the database or the memory.

According to some embodiments, the instructions further cause the one or more computing device processors to perform initiating retrieval of, using the one or more computing device processors, on the first communication channel with the database or the memory, the first instantaneous available allocation stored in the database or the memory.

According to some embodiments, the first network communication channel, the second network communication channel, the third network communication channel, and the first channel are part of the same communication interface or are part of different communication interfaces.

According to some embodiments, the instructions further cause the one or more computing device processors to perform: establishing a second communication channel with the database or the memory; and initiating retrieval of, using the one or more computing device processors, on the second communication channel with the database or the memory, the first instantaneous available allocation stored in the database or the memory.

According to some embodiments, the instructions further cause the one or more computing device processors to perform: establishing a fourth network communication channel with a fifth computing device; and initiating transmission of, using the one or more computing device processors, on the fourth network communication channel with the fifth computing device, the allocation data.

According to some embodiments, a non-transitory computer-readable medium for initiating an adjustment of the operation associated with the system for determining target allocation parameters for initiating targeted communications in complex computing networks, the non-transitory computer-readable medium may comprise code configured for: establishing a first network communication channel with a first computing device; receiving, using one or more computing device processors, from the first computing device, on the first network communication channel, a desired allocation for a first period comprising a first time, a second time, and a third time, wherein the third time is an end time of the first period; establishing a second network communication channel with a second computing device; receiving, using one or more computing device processors, from the second computing device, on the second network communication channel, data associated with a first execution event; determining, using the one or more computing device processors, and based on the data associated with the first execution event, a first instantaneous available allocation at the first time; generating, using the one or more computing device processors, and based on at least the first instantaneous available allocation, allocation data for a second period comprising the first time and not the second time; establishing a third network communication channel with the second computing device or a third computing device; receiving, using the one or more computing device processors, from the second computing device or the third computing device, on the third network communication channel, data associated with a second execution event; determining, using the one or more computing device processors, and based on the data associated with the second execution event, a second instantaneous available allocation at the second time after the first time, wherein the second instantaneous available allocation is not used to generate the allocation data associated with the second period comprising the first time and not the second time; establishing a first communication channel with a database or a memory; initiating transmission of, using the one or more computing device processors, on the first communication channel with database or the memory, the second instantaneous available allocation for storage in the database or the memory; determining, using the one or more computing device processors, and based on the allocation data for the second period comprising the first time, and not the second time, and the second instantaneous available allocation at the second time, a remaining available allocation at the second time or for allocating at or after the second time; and determining, using the one or more computing device processors, and based on the remaining available allocation and the desired allocation, the one or more target allocation parameters for initiating a targeted communication to a fourth computing device, different from the second computing device and the third computing device, during at least a portion of a third period between the second time and the third time.

DETAILED DESCRIPTION

Figure 1:
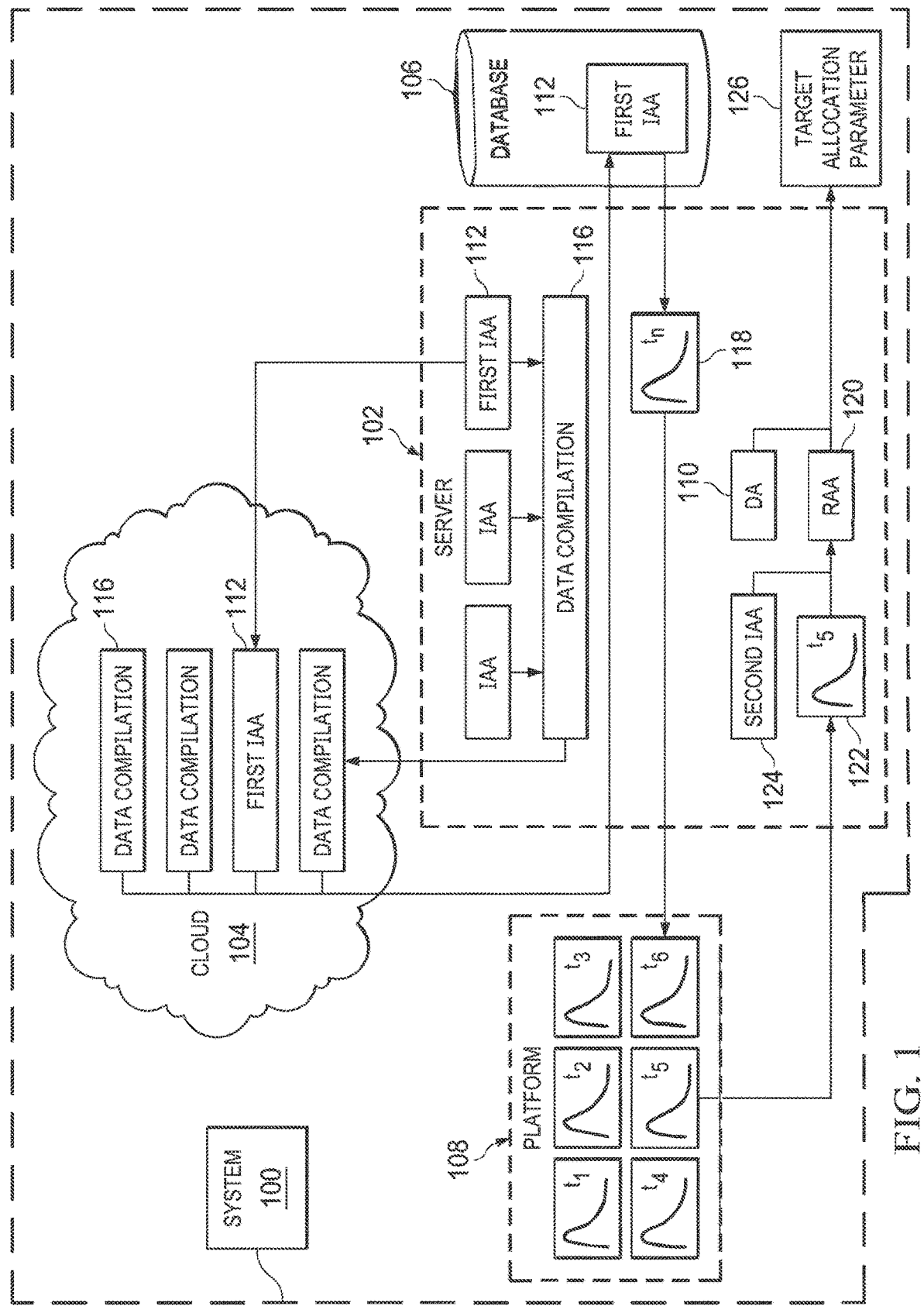
FIG. 1 shows a schematic block diagram of a system for determining target allocation parameters for initiating targeted communications in complex computing networks in accordance with some disclosed embodiments.

In the following detailed description, numerous specific details are set forth by way of examples in order to provide a thorough understanding of the relevant teachings. However, the present teachings may be practiced with or without such specific details. In other instances, well-known methods, procedures, components, and/or circuitry have been described at a relatively high level, without detail, in order to avoid unnecessarily obscuring aspects of the present teachings. The various technologies described in this specification generally relate to targeted communications in complex computing networks, which may be used to monitor, used to initiate, or may be otherwise associated with execution events.

It is understood that any features of any embodiment described herein may be incorporated into any other embodiment described herein. Features of different embodiments can be combined to form new embodiments. Further, any one or more of the steps, operations, etc., described herein may be performed in the order described or in any order. Any one or more of the steps, operations, etc., described herein may be removed and additional steps may be added. Although the present disclosure is related to targeted communications in complex computing networks, it should also be understood that any one or more of the methods, systems, operations, etc., described herein may be associated with other types of communications and networks. The terms communication channel and network communication channel may be used interchangeably. It is understood that any reference to a communication channel (e.g., first communication channel, second communication channel, third communication channel) or to a network communication channel (e.g., first network communication channel, second network communication channel, etc.) could mean any communication channel. For example, a first communication channel and a second communication channel could be the same communication channel or different communication channels.

A target allocation parameter may be associated with a current (i.e., instantaneous) or future execution event and may be determined using the disclosed systems and methods. According to some embodiments, a system for determining one or more target allocation parameters may comprise one or more servers, which may comprise at least one memory and one or more computing device processors. The at least one memory may comprise computing instructions and the one or more computing device processors may be configured to execute the instructions. The instructions may cause the one or more computing device processors to perform the operations of establishing a first network communication channel with a first computing device; receiving, on the first network communication channel, a desired allocation for a first period comprising a first time, a second time, and a third time, wherein the third time is an end time of the first period; establishing a second network connection channel with a second computing device; receiving, on the second network communication channel, data associated with a first execution event; determining, based on the data associated with the first execution event, a first instantaneous available allocation at the first time; generating, based on at least the first instantaneous available allocation, allocation data for a second period comprising the first time and not the second time; establishing a third network connection channel with the second computing device or a third computing device; receiving, on the third network communication channel, data associated with a second execution event; determining, based on the data associated with the second execution event, a second instantaneous available allocation at the second time after the first time, wherein the second instantaneous available allocation is not used to generate the allocation data associated with the second period comprising the first time and not the second time; initiating transmission of, on the communication channel with database or the memory, the second instantaneous available allocation for storage in the database or the memory; determining, based on the allocation data for the second period comprising the first time, and not the second time, and the second instantaneous available allocation at the second time, a remaining available allocation at the second time; and determining, based on the remaining available allocation and the desired allocation, the one or more target allocation parameters for initiating a targeted communication to a fourth computing device, different from the first computing device, the second computing device and the third computing device, during at least a portion of a third period between the second time and the third time.

As shown in FIG. 1, a system 100 for determining target allocation parameters for initiating targeted communications in complex computing networks may comprise a server 102, a cloud-based database 104, one or more databases 106, and one or more platforms 108. It is understood that a server 102 may comprise multiple components (e.g., a computing device processor, memory, input/output (I/O), communications center, etc.) and that any operation said to be performed by a server 102 herein may be performed by any one or a combination of any components which may comprise the server 102. For example, any operation said to be executed by a server 102 may be executed by one or more computing device processors associated with the server 102.

According to some embodiments, a server 102, using one or more computing device processors, may establish a network communication channel (e.g., first network communication channel, second network communication channel, third network communication channel, etc.) with a computing device, (e.g., first computing device, second computing device, third computing device, fourth computing device, etc.). A server 102 may receive, using one or more computing device processors, a desired allocation 110 from the computing device. A desired allocation 110, according to some embodiments, may be a total allocation (e.g., allocation pool) of allocatables over a first period of time comprising a first time, a second time, and a third time. A third time, in some embodiments, may be the end of the first period.

According to some embodiments, a server 102, using one or more computing device processors, may establish a network communication channel (e.g., first network communication channel, second network communication channel, third network communication channel, etc.) with a computing device, (e.g., first computing device, second computing device, third computing device, fourth computing device, etc.), on which it may receive, using one or more computing device processors, data associated with an execution event (e.g., first execution event, second execution event, third execution event, etc.). In some embodiments, a server 102 may receive data associated with a first execution event. Data associated with a first execution event may comprise any information (e.g., data) about the execution event. For example, according to some embodiments, data associated with a first execution event may comprise data associated with an opportunity to allocate as a part of an execution event, an attempted execution event, a successful execution event, etc. An execution event may, according to some embodiments, comprise an allocation (e.g., data transfers, data and/or signal processing operations, data allocations, material resource allocations, energy resource allocations, spending operations, targeted communications, computing resource allocations, etc.) of an allocatable (e.g., material, energy, currency, data, computing power, computing storage, computing memory, communications, computing resource, etc.).

According to some embodiments, a server 102, using one or more computing device processors, may determine a first instantaneous available allocation 112 at a first time. A first instantaneous available allocation 112 may be based on data associated with a first execution event. A first instantaneous available allocation 112 may comprise all or a portion of a desired allocation 110 and may comprise a total availability of an allocatable (e.g., in a desired allocation 110) at the first time. According to some embodiments, instantaneous available allocations (e.g., a first instantaneous available allocation 112) may be captured over time. A server 102, using one or more computing device processors, may generate a data compilation 118, which may, according to some embodiments, comprise multiple instantaneous available allocations captured over time. A data compilation 118 may comprise a first instantaneous available allocation 112.

A server 102, using one or more computing device processors, may establish any number of communication channels with cloud-based database 104, a database 106, or a memory. According to some embodiments, a communication channel may comprise a first communication channel, a second communication channel, a third communication channel, etc. In some embodiments, a server 102, using one or more computing device processors, may establish at least a first communication channel with a cloud-based database 104, a database 106, or a memory. Using the communication channel, a server 102, using one or more computing device processors, may initiate transmission of a first instantaneous available allocation 112 for storage.

In some embodiments, a server 102, using one or more computing device processors, may initiate transmission of a data compilation 116, which may comprise a first instantaneous available allocation 112, for storage. A server 102, using one or more computing device processors, may initiate retrieval a first instantaneous available allocation 112 stored in a cloud-based database 104, a database 106, or a memory. In some embodiments, an initiated retrieval of a first instantaneous available allocation 112 may be on a communication channel, (e.g., first communication channel, second communication channel, third communication channel, etc.) with a cloud-based database 104, a database 106, or a memory. In other embodiments, a server 102, using one or more computing device processors, may establish a second communication channel with a cloud-based database 104, a database 106, or a memory, and an initiated retrieval of a first instantaneous available allocation 112 may be on the second communication channel.

A server 102, using one or more computing device processors, may generate an allocation graph 118 for a second period. An allocation graph 118 may be based on at least a first instantaneous available allocation 112. A second period may comprise a first time of a first period and not a second time of a first period. For example, according to some embodiments, a first period may comprise a week (e.g., 7-day period), a second period may comprise a previous day (e.g., 24-hour period) in the week, and a first time may comprise a time during the previous day (e.g., second period) when an instantaneous available allocation 112 was captured. An allocation graph 118 may be generated for a second period (e.g., the previous day), and may be based on at least a first instantaneous available allocation 112 captured at a first time during the second period. An allocation graph 118, according to some embodiments, may be based on a collection of instantaneous available allocations (e.g., a first instantaneous available allocation 112) captured at different times (e.g. a first time) throughout a previous day (e.g., a second period) in a week (e.g. a first period).

In some embodiments, a server 102, using one or more computing devices processors, may generate allocation data associated with a second period. Allocation data may comprise any type or form (e.g., visual or non-visual, graphical or non-graphical, time-based plot/trace, other variable-based plot/trace, curve, etc.) of data associated with the second period. Allocation data may comprise, among other data, an allocation graph 118, an allocation curve, an allocation trace, an allocation plot, or raw or processed data associated with a second period. In some embodiments, any instances of allocation graph as used in any part of this disclosure may include allocation data, as defined in this disclosure.

In some embodiments, a server 102, using one or more computing device processors, may establish a network communication channel (e.g., first communication channel, second communication channel, third communication channel, fourth communication channel, fifth communication channel, etc.) with a fifth computing device. A fifth computing device may comprise a streaming platform 108 (e.g., a distributed streaming platform, a synchronization medium). A server 102, using one or more computing device processors, may initiate transmission of an allocation graph 118 to a fifth computing device on the network communication channel. In some embodiments, a server 102, using one or more computing device processors, may initiate retrieval of an allocation graph 118 from a fifth computing device (e.g., platform 108, synchronization medium) on a network communication channel (e.g., first network communication channel, second network communication channel, third network communication channel, fourth network communication channel, fifth network communication channel, etc.) with a fifth computing device. In some embodiments, a server 102, using one or more computing device processors, may receive an allocation graph 118 from a fifth computing device (e.g., platform 108, synchronization medium) on the fourth network communication channel or the fifth network communication channel.

A server 102, using one or more computing device processors, may establish a third network communication channel with a second computing device or a third computing device and may receive data associated with a second execution event on the third network communication channel. In some embodiments, the data associated with a second execution event may be received from a second computing device. In other embodiments, the data associated with a second execution event may be received from a third computing device. In other embodiments still, data associated with a second execution event may be received from any combination of a second computing device, a third computing device, and other computing devices. Data associated with a second execution event may comprise any information (e.g., data) about the second execution event. For example, according to some embodiments, data associated with a second execution event may comprise data associated with an opportunity to allocate as a part of an execution event, an attempted execution event, a successful execution event, etc.

A server 102, using one or more computing device processors, may determine a second instantaneous available allocation 124. In some embodiments, a second instantaneous available allocation 124 may be based on data associated with a second execution event. A second instantaneous available allocation 124 may be associated with a second time, which may be after a first time. For example, if a first period (e.g., a week) comprises a first time (e.g., a time at which an instantaneous available allocation 112 was captured), a second time, and a third time (e.g., end of the period), and a first time is a time during the second period (e.g., previous day), then a second time may comprise any time after the end of the second period, but before a third time which ends the first period (e.g., end of the week). A second instantaneous available allocation 124 at a second time, according to some embodiments, is not used to generate an allocation graph. Data associated with a second execution event, according to some embodiments, may comprise data associated with an opportunity to allocate as a part of an execution event, an attempted execution event, a successful execution event, etc.

According to some embodiments, a server 102, using one or more computing device processors, may initiate transmission of a second instantaneous available allocation 124 for storage in a cloud-based database 104, a database 106, or a memory. An initiated transmission may use a communication channel (e.g., first communication channel, second communication channel, third communication channel, etc.) or a network communication channel to transmit a second instantaneous available allocation 124. In some embodiments, a server 102 initiates transmission of a second instantaneous available allocation 124 on a communication channel (e.g., first communication channel, second communication channel, first network communication channel, second network communication channel, etc.) or a network communication channel. A server 102, using one or more computing device processors, may retrieve a stored second instantaneous available allocation 124 from a cloud-based database 104, a database 106, or a memory, on a communication channel (e.g., first communication channel, second communication channel, third communication channel, etc.) or a network communication channel.

A server 102, using one or more computing device processors, may determine a remaining available allocation 120. In some embodiments, a remaining available allocation 120 may be associated with a second time, as the second time is described above, or associated with a period after the second time (e.g., up to an end time of a period associated with a desired allocation). A remaining available allocation 120 may be based on one or more of an allocation graph for a second period and a second instantaneous available allocation 124 at a second time. In some embodiments, a remaining available allocation 120 may be associated with the availability of an allocatable to be allocated during a period (e.g., first period, second period, third period, etc.).

Figure 2:
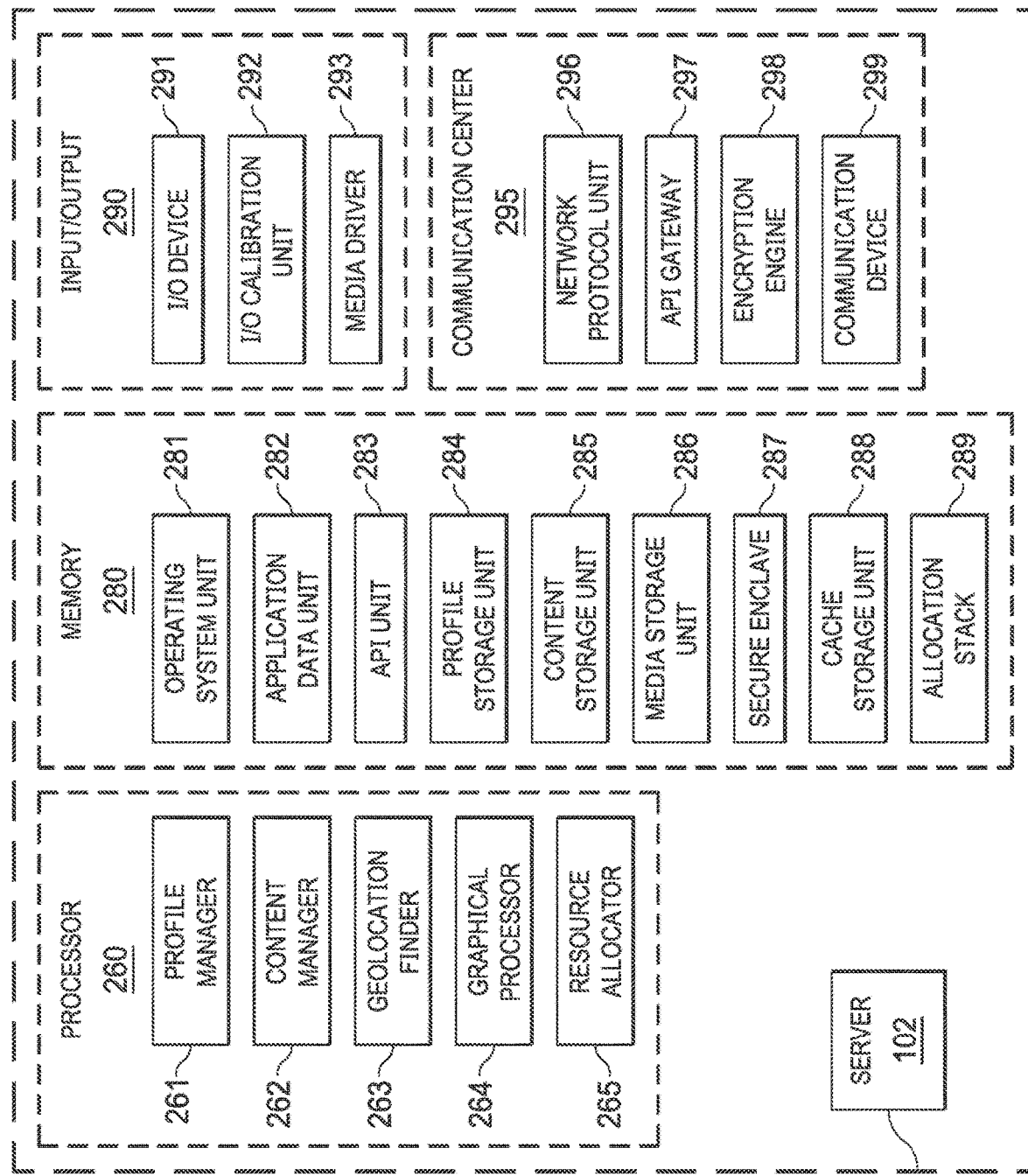
FIG. 2 shows a functional block diagram of a server for control and manipulation of data and processes associated with disclosed systems and methods for determining target allocation parameters for initiating targeted communications in complex computing networks in accordance with some disclosed embodiments.

A server 102, using one or more computing device processors, may determine one or more target allocation parameters 126 for initiating a targeted communication to a computing device (e.g., first computing device, second computing device, third computing device, fourth computing device, etc.). A targeted communication may comprise a message, instructions, identification data, content, advertisement data, or any other data described in this disclosure, including those associated with execution events. The one or more target allocation parameters 126 for initiating a targeted communication to a computing device may comprise one or more allocation parameters (e.g., timing, frequency, quantity (absolute or relative with regard to total allocatables), etc.) and may be determined based on any combination of a remaining available allocation 120, a desired allocation 110, and other information. The one or more target allocation parameters may be associated with at least a portion of a period (e.g., first period, second period, third period, etc.). In some embodiments, the one or more target allocation parameters 126 may be associated with initiating a targeted communication during at least a portion of a third period, which may comprise a period between a second time and a third time (e.g., end of the first period). A targeted communication may be, according to some embodiments, associated with an execution event, which may comprise one or more of: a data transfer, a data allocation operation, a data or signal processing operation, a material resource allocation, an energy resource allocation, and a computing resource allocation Referring now to FIG. 2, an operating system for determining target allocation parameters for initiating targeted communications in complex computing networks may comprise or may be implemented in one or more servers 102, where the one or more servers 102 may comprise any combination of at least one memory 280 comprising server instructions, and at least one processing device 260 (e.g., computing device processors) configured for executing the server instructions, an input/output (I/O) 290, and communications center 295. A computing system or server associated with for determining target allocation parameters for initiating targeted communications in complex computing networks may be one or more local or remote systems. Any one or more of the subsystems described below may be optional and may be present in the same computing system or in disparate, e.g. local or remote, computing systems which may be in network communication with each other. As described in present embodiments, each of the processor 260, the memory 280, the I/O 260, and communication center 295 may include a plurality of respective units, subunits, and/or elements. Furthermore, each of the processor 260, the memory 280, the I/O 290, and the communication center 295 may be operatively or otherwise communicatively coupled with each other so as to facilitate the methods and techniques described herein.

The processor 260 may control any one or more of the memory 280, the I/O 290, the communication center 295, or any other unit which may include the server 102, as well as any included subunits, elements, components, devices, or functions performed by each or a combination of the memory 280, the I/O 290, the communication center 295 or any other unit which may include the server 102. Any of the elements or sub-elements of the server 102 presented here may also be included in a similar fashion in any of the other units, subunits, and devices included in the system of FIG. 1. Additionally, any actions described herein as being performed by a processor 260 may be taken by the processor 260 alone, or by the processor 260 in conjunction with one or more additional processors, units, subunits, elements, components, devices, and the like. Additionally, while only one processor 260 may be shown in the figures included here, multiple processors may be present or otherwise included in the server 102 or elsewhere in the system of FIG. 1. Thus, while instructions may be described as being executed by the processor 260 or the various subunits of the processor 261, 262, 263, 264, 265, the instructions may be executed simultaneously, serially, or otherwise by one or more multiple processors 260.

In some embodiments, a processor 260 may be implemented as one or more computer processor (CPU) chips, graphical processor (GPU) chips, or some combination of CPU chips and GPU chips, and may include a hardware device capable of executing computer instructions. The processor 260 may execute any combination of instructions, codes, computer programs, and scripts. The instructions, codes, computer programs, and scripts may be received from, stored in, or received from and stored in any combination of the memory 280, the I/O 290, the communication center 295, subunits of the previously described elements, other devices, other computing environments.

In some embodiments, the processor 260 may include, among other elements, subunits. Subunits may include any combination of a profile manager 261, a content manager 262, a geolocation finder 263, a graphical processor 264, and a resource allocator 265. Each of these subunits of the processor 260 may be communicatively or otherwise operably coupled with each other.

The profile manager 261 may facilitate any combination of generation, modification, analysis, transmission, and presentation of a profile associated with a user or with a computing device (e.g., first computing device, second computing device, third computing device, etc.). The profile manager 261 may also control or utilize an element of the I/O 290 to enable a user or a computing device to associate an identifier, location, etc. with itself. The profile manager 261 may receive, process, analyze, organize, transform, or any combination of these, any received from the user or another computing element as to generate a profile of a user or a computing device. For example, in some embodiments, a computing device (e.g., second computing device, third computing device, etc.) may have a profile that identifies the computing device and its location. In some embodiments, a profile manager 261 may be able to generate a profile associated with a user of a computing device (e.g., first computing device, second computing device, etc.). A computing device and/or user may be associated with a desired spend.

The content manager 262 may facilitate any combination of generation, modification, analysis, transmission, and presentation of any media content associated with systems and methods for determining target allocation parameters for initiating targeted communications in complex computing networks. For example, the content manager 262 may facilitate media content associated with a user interface with any one or more computing devices associated with the system.

The geolocation finder 263, particularly in communication with geolocation information provided by available GPS subsystems which may be present elsewhere in the described systems, may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 263 may include any one or a combination of various sensors, specifically-purposed hardware elements for enabling the geolocation finder 263 to acquire, measure, and transform location information. For example, the geolocation finder 263 may facilitate the processing of geolocation data associated with computing devices associated with a desired allocation, data associated with an execution event, and/or streaming platform.

The graphical processor (GPU) 264 may facilitate any combination of generation, modification, analysis, processing, transmission, and presentation of visual content. In some embodiments, the GPU 264 may be configured to receive images associated with a system and methods for determining target allocation parameters for initiating targeted communications in complex computing networks. Further, the GPU 264 may be configured to facilitate adjustments to videos and images. The GPU 264 may also be configured to render visual content for presentation on a device and/or to analyze visual content for metadata associated with a component of any one or more of the systems described. In some embodiments, this visual content may include a real-time image. The GPU 264 may include multiple GPUs and may therefore be configured to perform and/or execute multiple processes in parallel.

The resource allocator 265 may facilitate any one or combination of the determination, monitoring, analysis, and allocation of resources throughout the server 102, any one or more of the disclosed systems, any component of the system, or other computing environments. For example, the resource allocator 265 may facilitate interaction between the server 102, any subunit of the server 102, and a high volume (e.g. multiple) of users, inputs, computing devices, etc. As such, computing resources of the server 102 utilized by any one or a combination of the processor 260, the memory 280, the I/O 290, the communication center 295, and any subunit of these units, such as processing power, data storage space, network bandwidth, and the like may be in high demand at various times during operation. Accordingly, the resource allocator 265 may be configured to manage the allocation of various computing resources as they are required by particular units or particular subunits of the server 102.

In some embodiments, the resource allocator 265 may include sensors and/or other specially-purposed hardware for monitoring performance of each unit and/or subunit of the server 102, as well as hardware for responding to the computing resource needs of each unit or subunit. In some embodiments, the resource allocator 265 may utilize computing resources of a second computing environment separate and distinct from the server 102 to facilitate a desired operation.

In some embodiments, factors affecting the allocation of computing resources by the resource allocator 265 may include the number of ongoing connections, network communication channels, and/or other communication channel connections, a duration during which computing resources are required by one or more elements of the server 102, and/or the like. In some embodiments, computing resources may be allocated to and/or distributed amongst a plurality of second computing environments included in the server 102 based on one or more factors mentioned above. In some embodiments, the allocation of computing resources of the resource allocator 265 may include one or more resource allocators 265 flipping a switch, adjusting processing power, adjusting memory size, partitioning a memory element, transmitting data, controlling one or more input and/or output devices, modifying various communication protocols, and the like. In some embodiments, the resource allocator 265 may facilitate utilization of parallel processing techniques such as dedicating a plurality of GPUs included in the processor 260 for processing high-quality analysis and manipulation of, for example, allocation graphs, instantaneous available allocations, remaining allocations, etc.

In some embodiments, the memory 280 may be utilized for one or any combination of storing, recalling, receiving, transmitting, and/or accessing various files and/or information during operation of the server 102. For example, the memory 280 may be utilized for storing available allocations, allocation graphs, desired allocations, etc., associated with systems and methods of determining target allocation parameters for initiating targeted communications in complex computing networks. The memory 280 may additionally be used for storing, recalling, and/or updating user or other system information and the like. The memory 280 may include various types of data storage media such as solid state storage media, hard disk storage media, and any other type of data storage medium which may be known to a person of ordinary skill in the art. The memory 280 may include dedicated hardware elements such as hard drives and/or servers, as well as software elements such as cloud-based storage drives. For example, the memory unit 280 may include various subunits such as an operating system unit 281, an application data unit 282, an application programming interface (API) unit 283, a profile storage unit 284, a content storage unit 285, a video storage unit 286, a secure enclave 287, a cache storage unit 288, and/or an allocation stack 289.

The memory 280 and any of its subunits described here may include any one or any combination of random access memory (RAM), read only memory (ROM), and various forms of secondary storage. RAM may be used to store volatile data and/or to store instructions that may be executed by the processor 260. For example, the data stored may be any one or a combination of a command, a current operating state of the server 102, an intended operating state of the server 102, and the like. As a further example, data stored in the memory 280 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 280 may include one or more databases for storing any data described here. Additionally or alternatively, one or more secondary databases located remotely from the server 102 may be utilized and/or accessed by the memory 280.

The operating system unit 281 may facilitate deployment, storage, access, execution, and/or utilization of an operating system utilized by the server 102 and/or any other computing environment described herein. In some embodiments, the operating system may include various hardware and/or software elements that serve as a structural framework for enabling the processor 260 to execute various operations such as the analysis of data (e.g., data associated with an execution event), generation of data and/or parameters (e.g. an instantaneous available allocation, a target allocation parameter, etc.). The operating system unit 281 may further store various pieces of information and/or data associated with operation of the operating system and/or the server 102 as a whole, such as a status of computing resources (e.g., processing power, memory availability, resource utilization, and/or the like), runtime information, modules to direct execution of operations described herein, user permissions, security credentials, and the like.

The application data unit 282 may facilitate deployment, storage, access, execution, and/or utilization of an application utilized by the server 102 or any other computing environment described herein. For example, it may be desirable for a user to download, access, and/or otherwise utilize a software application on a user device such as a smartphone or other internet-enabled device in order to monitor any one or more of the various operations described herein to be performed. As such, the application data unit 282 may store any information and/or data associated with the application which may allow the application and/or user device to monitor, initiate, or otherwise access the methods and systems associated with initiating adjustment of an operation associated with any one or more of the systems described herein. As such, information included in the application data unit 282 may enable a user to execute various operations described. The application data unit 282 may further store various pieces of information and/or data associated with operation of the application and/or the server 102 as a whole, such as a status of computing resources (e.g., processing power, memory availability, resource utilization, and/or the like), runtime information, modules to direct execution of operations described herein, user permissions, security credentials, and the like.

The application programming interface (API) unit 283 may facilitate deployment, storage, access, execution, and/or utilization of information associated with APIs of the server 102 and/or any other computing environment described herein (e.g., a computing device, system component, etc.). For example, server 102 may include one or more APIs for enabling various devices, applications, and/or computing environments to communicate with the server 102, multiple other servers, databases, or other user devices. Accordingly, the API unit 283 may include API databases containing information that may be accessed and/or utilized by applications and/or operating systems of other devices, components, and/or computing environments associated with determining target allocation parameters for initiating targeted communications in complex computing networks. An API may direct communications between any component of the described systems and the server 102. In some embodiments, each API database may be associated with a customized physical circuit included in the memory unit 280 and/or the API unit 283. Additionally, each API database may be public and/or private, and so authentication credentials may be required to access information in an API database.

The profile storage unit 284 may facilitate deployment, storage, access, and/or utilization of information associated with any user and/or computing device (e.g., a first computing device, second computing device, third computing device, etc.) profiles of any system user by the server 102 and any other computing environment described here (e.g., a computing device, system components, etc.). For example, the profile storage unit 284 may store one or more of a user's contact information, authentication credentials, user preferences, user history, personal information, and metadata. The profile storage unit 284 may store information about a specific computing device (e.g., location, etc.). The profile storage unit 284 may store any data associated with a particular or group of users, systems, and/or computing devices for analysis, etc. In some embodiments, the profile storage unit 284 may communicate with the profile manager 261 to receive and/or transmit information associated with a user's and/or a computing device's profile.

The content storage unit 285 may facilitate deployment, storage, access, and/or utilization of information associated with requested content by the server 102 and/or any other computing environment described here. For example, the content storage unit 285 may store one or more of images, text, analytical data, historical data, metadata, etc. to be utilized during operations described herein. In some embodiments, the content storage unit 285 may communicate with the content manager 262 to receive and/or transmit content files.

The media storage unit 286 may facilitate one or more of deployment, storage, access, analysis, and utilization of media content by the server 102 and any other computing environment described herein. Media content may be images, videos, audio files, graphs, and any other form of communicative media. For example, the media storage unit 286 may store one or more representations of allocation graphs which may be utilized in association with determining target allocation parameters for initiating targeted communications in complex computing networks. Further, the media storage unit 286 may store one or more images which have been manipulated by any unit or subunit of a server 102 or other component of a system for determining target allocation parameters for initiating targeted communications in complex computing networks. Media content generated or used in performing any of the methods disclosed here may be stored in the media storage unit 286 so that the media content may be analyzed by various components of the server 102 both in real time and at a time after receipt of the media content. In some embodiments, the media storage unit 286 may communicate with the GPUs 264 to facilitate any of the processes described here. In some embodiments, media content may include audio, images, text, video feeds, analytical results, graphical representations of results and/or analyses, and/or any other media content associated with systems and methods of determining target allocation parameters for initiating targeted communications in complex computing networks.

The secure enclave 287 may facilitate secure storage of data. In some embodiments, the secure enclave 287 may include a partitioned portion of storage media included in the memory unit 280 that is protected by various security measures. For example, the secure enclave 287 may be hardware secured. In other embodiments, the secure enclave 287 may include one or more firewalls, encryption mechanisms, and/or other security-based protocols. Authentication credentials may be required prior to providing access to data stored within the secure enclave 287. In some embodiments, the secure enclave 287 may store sensitive information associated with any of the systems or methods described herein.

The cache storage unit 288 may facilitate short-term deployment, storage, access, analysis, and/or utilization of data. In some embodiments, the cache storage unit 288 may serve as a short-term storage location for data so that the data stored in the cache storage unit 288 may be accessed quickly. In some embodiments, the cache storage unit 288 may include RAM and/or other storage media types that enable quick recall of stored data. The cache storage unit 288 may include a partitioned portion of storage media included in the memory 280. In some embodiments, the cache storage unit 288 may store data associated with initiating adjustment of an operation associated with a system for determining target allocation parameters for initiating targeted communications in complex computing networks, computational instructions for analysis of data associated with determining target allocation parameters for initiating targeted communications in complex computing networks, or other data which may be frequently used in any of the processes, method, etc., associated with the systems or methods described herein.

A memory 280 may comprise, according to some embodiments, an allocation stack 289. An allocation stack 289 may be utilized to store instructions relating to the processing, distribution, managing, storing, and other functions related to allocation data. In some embodiments, an allocation stack 289 may store instructions related to processing allocation data prior to determining a remaining available allocation.

The I/O unit 290 may include hardware and/or software elements for enabling the server 102 to receive, transmit, and/or present information. For example, elements of the I/O unit 290 may be used to receive input from a component of a system for determining target allocation parameters for initiating targeted communications in complex computing networks (e.g., a computing device, a data source, etc.), present data, manipulated data, allocation graphs, etc. As described, the I/O unit 290 may include subunits such as one or a combination of an I/O device 291, I/O calibration unit 292, and/or media driver 293.

The I/O device 290 may facilitate any one or any combination of the receipt, transmission, processing, presentation, display, input, and output of information as a result of executed processes described here. In some embodiments, the I/O device 290 may include a plurality of I/O devices. In some embodiments, the I/O device 290 may include one or more elements of any one or a combination of a component of a system for determining target allocation parameters for initiating targeted communications in complex computing networks, a computing system, a server 102, and a similar device.

The I/O device 291 may include a variety of elements that enable a user or a component of a system for determining target allocation parameters for initiating targeted communications in complex computing networks to interface with the server 102. For example, the I/O device 291 may include a keyboard, a touchscreen, a button, a sensor, a biometric scanner, a laser, a microphone, a camera, an internet-enabled device, and/or another element for receiving and/or collecting input from a user or from a component of any of the systems described herein. Additionally and/or alternatively, the I/O device 291 may include a display, a screen, a sensor, a vibration mechanism, a light emitting diode (LED), a speaker, a radio frequency identification (RFID) scanner, and/or another element for presenting and/or otherwise outputting data to a user or to a component of any of the systems described herein, including a means to send instructions to any one or more components which may be associated with a determining target allocation parameters for initiating targeted communications in complex computing networks. In some embodiments, the I/O device 291 may communicate with one or more elements of the processor 260 and/or the memory unit 280 to execute operations described herein.

The I/O calibration unit 292 may facilitate the calibration of the I/O device 291. For example, the I/O calibration unit 292 may detect and/or determine one or more settings of the I/O device 291, and then adjust and/or modify settings so that the I/O device 291 may operate more efficiently. In some embodiments, the I/O calibration unit 292 may utilize a media driver 293 (or multiple media drivers) to calibrate the I/O device 291. The media driver 293 may be installed on a user device so that the user device may recognize and/or integrate with the I/O device 291, thereby enabling media content to be displayed, received, generated, and the like. In some embodiments, the I/O device 291 may be calibrated by the I/O calibration unit 292 by based on information included in the media driver 293.

The communication center 295 may facilitate establishment, maintenance, monitoring, and/or termination of communications between the server 102 and other components of a system for determining target allocation parameters for initiating targeted communications in complex computing networks, other computing environments, third party server systems, and the like. The communication center 295 may further enable communication between various elements (e.g., units and/or subunits) of the server 102 as needed to carry out any one or more of the functions associated with the systems and methods described herein. In some embodiments, the communication center 295 may include a network protocol unit 296, an API gateway 297, an encryption engine 298, and/or a communication device 299. The communication center 295 may include hardware and/or software elements.

The network protocol unit 296 may facilitate establishment, maintenance, and/or termination of a communication connection (e.g., communication channel, network communication channel) between the server 102 and any other component of a system for determining target allocation parameters for initiating targeted communications in complex computing networks and/or another device by way of a network. For example, the network protocol unit 296 may detect and/or define a communication protocol required by a particular network and/or network type. Communication protocols utilized by the network protocol unit 296 may include Wi-Fi protocols, Li-Fi protocols, cellular data network protocols, Bluetooth® protocols, WiMAX protocols, Ethernet protocols, power line communication (PLC) protocols, and the like. In some embodiments, facilitation of communication between the server 102 and any other component and/or other device, as well as any element internal to the server 102, may include transforming and/or translating data from being compatible with a first communication protocol to being compatible with a second communication protocol. In some embodiments, the network protocol unit 296 may determine and/or monitor an amount of data traffic to consequently determine which particular network protocol is to be used for establishing a connection with a component, device, transmitting data, and/or performing other operations described herein.

The API gateway 297 may facilitate the enablement of other devices and/or computing environments to access the API unit 283 of the memory 280 of the server 102. For example, a user device may access the API unit 283 via the API gateway 297. In some embodiments, the API gateway 297 may be required to validate user credentials associated with a user or a computing device (e.g., first computing device, second computing device, etc.) prior to providing access to the API unit 283 to the user or computing device. The API gateway 297 may include instructions for enabling the server 102 to communicate with another device.

The encryption engine 298 may facilitate any one or any combination of translation, encryption, encoding, decryption, and decoding of information received, transmitted, and/or stored by the server 102. For example, the encryption engine 298 may encrypt data associated with a component of a system for determining target allocation parameters for initiating targeted communications in complex computing networks, historical and/or analytical data, images, instantaneous data, etc. Using the encryption engine, each transmission of data may be encrypted, encoded, and/or translated for security reasons, and any received data may be encrypted, encoded, and/or translated prior to its processing and/or storage. In some embodiments, the encryption engine 298 may generate any one or combination of an encryption key, an encoding key, a translation key, and the like, which may be transmitted along with any data content.

The communication device 299 may include a variety of hardware and/or software specifically purposed to enable communication between the server 102 and another component of a system for determining target allocation parameters for initiating targeted communications in complex computing networks, and/or other device, as well as communication between elements of the server 102. In some embodiments, the communication device 299 may include one or more radio transceivers, chips, analog front end (AFE) units, antennas, processors, memory, other logic, and/or other components to implement communication protocols (wired or wireless) and related functionality for facilitating communication between the server 102 and any other device and/or component. Additionally and/or alternatively, the communication device 299 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

As used herein, the term "signal" may refer to a single signal or multiple signals. The term "signals" may refer to a single signal or multiple signals. Any reference to a signal may be a reference to an attribute of the signal.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems such as servers.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Furthermore, any reference in this disclosure to "invention" in the singular should not be used to argue that there is only a single point of novelty in this disclosure. Multiple inventions may be set forth herein.

The invention claimed is:

1. A method for determining one or more allocation parameters for initiating targeted communications, the method comprising:

establishing a first network communication channel with a first computing device;

receiving, using one or more computing device processors, from the first computing device, on the first network communication channel, a desired allocation associated with a first period;

establishing a second network communication channel with a second computing device;

receiving, using the one or more computing device processors, from at least one of the second computing device on the second network communication channel or the first computing device on the first network communication channel, first data associated with a first execution event;

determining, using the one or more computing device processors, and based on the first data associated with the first execution event, a first available allocation;

generating or modifying, using the one or more computing device processors, and based on at least the first available allocation, allocation information associated with a second period;

generating or modifying, using the one or more computing device processors, based on at least the first available allocation, a first visual display of the allocation information associated with the second period;

establishing a third network communication channel with the second computing device or a third computing device;

receiving, using the one or more computing device processors, from at least one of the second computing device on the second network communication channel, the third computing device on the second network communication channel or the third network communication channel, or the first computing device on the first network communication channel, second data associated with the first execution event or a second execution event;

determining, using the one or more computing device processors, and based on the second data associated with the first execution event or the second execution event, a second available allocation, wherein the second available allocation is not used to generate the allocation information associated with the second period;

determining, using the one or more computing device processors, and based on the allocation information associated with the second period and the second available allocation, a remaining available allocation;

generating or modifying, using the one or more computing device processors, a data compilation, wherein the data compilation comprises or is based on at least one of: the first available allocation, the second available allocation, or the remaining available allocation;

generating or modifying, using the one or more computing device processors, a second visual display of the data compilation; and determining, using the one or more computing device processors, and based on the data compilation and the desired allocation associated with the first period, one or more allocation parameters for initiating a first targeted communication to a fourth computing device, during at least a portion of a third period, wherein at least one of the first data associated with the first execution event, the second data associated with the second execution event, or the first targeted communication comprises or is associated with third data associated with one or more of: an execution event, an opportunity to allocate as a part of the execution event, a current execution event, a future execution event, an attempted execution event, and a successful execution event, and wherein the first execution event or the second execution event comprises one or more of: a first data transfer, a first data or signal processing operation, a first data allocation, a first material resource allocation, a first energy resource allocation, the first targeted communication, a second communication, and a first computing resource allocation.

2. The method of claim 1, further comprising initiating transmission of, using the one or more computing device processors, on a first communication channel with a database or a memory, at least one of the first available allocation, the second available allocation, the desired allocation associated with the first period, the allocation information associated with the second period, or the data compilation for storage in the database or the memory.

3. The method of claim 1, further comprising initiating retrieval of, using the one or more computing device processors, on a first communication channel with a database or a memory, at least one of the first available allocation, the second available allocation, the desired allocation associated with the first period, the allocation information associated with the second period, or the data compilation stored in the database or the memory.

4. The method of claim 1, further comprising:
establishing a first communication channel with a database or a memory; and
initiating retrieval or transmission of, using the one or more computing device processors, on the first communication channel with the database or the memory, at least one of the first available allocation, the second available allocation, the desired allocation associated with the first period, the allocation information associated with the second period, or the data compilation.

5. The method of claim 1, wherein a database comprises a cloud-based database.

6. The method of claim 1, wherein the first targeted communication is associated with a third execution event.

7. The method of claim 6, wherein the third execution event comprises one or more of: a second data transfer, a second data allocation operation, a second data or signal processing operation, a second material resource allocation, a second energy resource allocation, and a second computing resource allocation.

8. The method of claim 1, further comprising:
establishing a fourth network communication channel with a fifth computing device; and
initiating transmission of, using the one or more computing device processors, on the fourth network communication channel with the fifth computing device, the allocation information associated with the second period or the second visual display of the allocation information associated with the second period.

9. The method of claim 8, wherein the fifth computing device comprises a streaming platform.

10. The method of claim 8, further comprising initiating retrieval of, using the one or more computing device processors, the allocation information associated with the second period from the fifth computing device.

11. A computing system for determining one or more operation parameters associated with determining allocation parameters for initiating targeted communications in complex computing networks, the computing system comprising:
at least one memory comprising instructions; and
one or more computing device processors for executing the instructions, wherein the instructions cause the one or more computing device processors to perform operations of:
establishing a first network communication channel with a first computing device,
receiving, from the first computing device, on the first network communication channel, a desired allocation associated with a first period,
establishing a second network communication channel with a second computing device,
receiving, from at least one of the second computing device on the second network communication channel or the first computing device on the first network communication channel, first data associated with a first execution event,
determining, based on the first data associated with the first execution event, a first available allocation,
generating or modifying, based on at least the first available allocation, allocation information associated with a second period,
generating or modifying, based on at least the first available allocation, a first visual display of the allocation information associated with the second period,
establishing a third network communication channel with the second computing device or a third computing device,
receiving, from at least one of the second computing device on the second network communication channel, the third computing device on the second network communication channel or the third network communication channel, or the first computing device on the first network communication channel, second data associated with the first execution event or a second execution event,
determining, based on the second data associated with the first execution event or the second execution event, a second available allocation, wherein the second available allocation is not used to generate the allocation information associated with the second period,
determining, based on the allocation information associated with the second period and the second available allocation, a remaining available allocation,
generating or modifying a data compilation, wherein the data compilation comprises or is based on at least one of: the first available allocation, the second available allocation, or the remaining available allocation,
generating or modifying a second visual display of the data compilation, and
determining, based on the data compilation and the desired allocation associated with the first period, one or more allocation parameters for initiating a targeted communication to a fourth computing device, during at least a portion of a third period,
wherein at least one of the first data associated with the first execution event, the second data associated with the first execution event or the second execution event, or the targeted communication comprises or is associated with third data associated with one or more of: an execution event, an opportunity to allocate as a part of the execution event, a current execution event, a future execution event, an attempted execution event, and a successful execution event, and
wherein the first execution event or the second execution event comprises one or more of: a data transfer, a data or signal processing operation, a data allocation, a material resource allocation, an energy resource allocation, the targeted communication, a second communication, and a computing resource allocation.

12. The computing system of claim 11, wherein the instructions further cause the one or more computing device processors to perform initiating transmission of, on a first communication channel with a database or a memory, at least one of the first available allocation, the second available allocation, the desired allocation associated with the first period, the allocation information associated with the second period, or the data compilation for storage in the database or the memory.

13. The computing system of claim 11, wherein the instructions further cause the one or more computing device processors to perform initiating retrieval of, on a first communication channel with a database or a memory, at least one of the first available allocation, the second available allocation, the desired allocation associated with the first period, the allocation information associated with the second period, or the data compilation stored in the database or the memory.

14. The computing system of claim 11, wherein the first network communication channel, the second network communication channel, and the third network communication channel are part of the same communication interface or are part of different communication interfaces.

15. The computing system of claim 11, wherein the instructions further cause the one or more computing device processors to perform:
   establishing a first communication channel with a database or a memory, and
   initiating retrieval or transmission of, on the first communication channel with the database or the memory, at least one of the first available allocation, the second available allocation, the desired allocation associated with the first period, the allocation information associated with the second period, or the data compilation.

16. The computing system of claim 11, wherein the instructions further cause the one or more computing device processors to perform:
   establishing a fourth network communication channel with a fifth computing device, and
   initiating transmission of, on the fourth network communication channel with the fifth computing device, the allocation information associated with the second period or the second visual display of the allocation information associated with the second period.

17. A non-transitory computer-readable medium for determining allocation parameters for initiating targeted communications in complex computing networks, the non-transitory computer-readable medium comprising code configured for:
   establishing a first network communication channel with a first computing device;
   receiving, from the first computing device, on the first network communication channel, a desired allocation associated with a first period;
   establishing a second network communication channel with a second computing device;
   receiving, from at least one of the second computing device on the second network communication channel or the first computing device on the first network communication channel, first data associated with a first execution event;
   determining, based on the first data associated with the first execution event, a first available allocation;
   generating or modifying, based on at least the first available allocation, allocation information associated with a second period;
   generating or modifying, based on at least the first available allocation, a first visual display of the allocation information associated with the second period;
   establishing a third network communication channel with the second computing device or a third computing device;
   receiving, from at least one of the second computing device on the second network communication channel, the third computing device on the second network communication channel or the third network communication channel, or the first computing device on the first network communication channel, second data associated with the first execution event or a second execution event;
   determining, based on the second data associated with the first execution event or the second execution event, a second available allocation, wherein the second available allocation is not used to generate the allocation information associated with the second period;
   determining, based on the allocation information associated with the second period and the second available allocation, a remaining available allocation;
   generating or modifying a data compilation, wherein the data compilation comprises or is based on at least one of: the first available allocation, the second available allocation, and the remaining available allocation;
   generating or modifying a second visual display of the data compilation; and
   determining, based on the data compilation and the desired allocation associated with the first period, one or more allocation parameters for initiating a targeted communication to a fourth computing device, during at least a portion of a third period,
   wherein at least one of the first data associated with the first execution event, the second data associated with the first execution event or the second execution event, or the targeted communication comprises or is associated with third data associated with one or more of: an execution event, an opportunity to allocate as a part of the execution event, a current execution event, a future execution event, an attempted execution event, and a successful execution event, and
   wherein the first execution event or the second execution event comprises one or more of: a data transfer, a data or signal processing operation, a data allocation, a material resource allocation, an energy resource allocation, the targeted communication, a second communication, and a computing resource allocation.

18. The method of claim 1, wherein the first available allocation comprises a first instantaneous available allocation and the second available allocation comprises a second instantaneous available allocation.

19. The method of claim 1, wherein at least one of:
   the allocation information comprises an allocation graph, or
   the one or more allocation parameters comprise one or more target allocation parameters.

20. The method of claim 1, wherein the one or more computing device processors are comprised in one or more computing systems, wherein the one or more computing systems are located in one or more locations.

* * * * *